United States Patent [19]

Sullivan et al.

[11] 3,731,749

[45] May 8, 1973

[54] TOWED PLOW

[75] Inventors: James Franklin Sullivan, East Moline; Loren Glenn Arnold, Rock Island, both of Ill.

[73] Assignee: Deere & Company, Moline, Ill.

[22] Filed: Feb. 23, 1971

[21] Appl. No.: 117,951

[52] U.S. Cl. ............... 172/401, 172/414, 280/43.23
[51] Int. Cl. .............................................. A01b 63/16
[58] Field of Search ..................... 172/282, 285, 288, 172/395, 401, 315–316, 414, 468–471, 473, 491, 501; 280/43.13, 43.23, 414.5

[56] References Cited

UNITED STATES PATENTS

| | | | |
|---|---|---|---|
| 3,583,494 | 6/1971 | Thompson et al. | 172/285 |
| 3,481,407 | 12/1969 | Arnold et al. | 172/288 |
| 3,627,053 | 12/1971 | Hook et al. | 172/316 |
| 3,209,839 | 10/1965 | Morkoski et al. | 172/414 |
| 3,065,803 | 11/1962 | Pierson et al. | 172/316 |
| 2,670,713 | 3/1954 | Jirsa | 172/316 |
| 1,926,401 | 9/1933 | Paul | 172/414 |
| 1,931,815 | 10/1933 | Conley | 172/316 |
| 1,331,044 | 2/1920 | Bartholomew | 172/294 |
| 2,638,044 | 5/1953 | Toland | 280/43.23 |
| 3,543,864 | 12/1970 | Wenzel et al. | 280/43.23 |
| 3,228,484 | 1/1966 | Arnold et al. | 172/400 |
| 3,630,290 | 12/1971 | Williams et al. | 172/400 |
| 3,236,313 | 2/1966 | Arnold et al. | 172/328 |
| 3,666,284 | 5/1972 | Hunter et al. | 280/43.23 |

Primary Examiner—Robert E. Pulfrey
Assistant Examiner—C. W. Hanor
Attorney—H. Vincent Harsha, Harold M. Knoth, William A. Murray, John M. Nolan and Raymond L. Hollister

[57] ABSTRACT

The frame of a gang plow is supported on front and rear furrow wheels and a land wheel, and is raised and lowered on the wheels by double-acting extensible and retractable hydraulic cylinders which are connected in series with the hydraulic cylinder for the land wheel being first in the series when raising. Stops are provided to determine the plowing position of the frame with respect to the furrow wheels and the hydraulic cylinders for the furrow wheels have lost-motion connections with the frame which permit limited additional retraction of the hydraulic cylinders after the frame has been lowered on the furrow wheels to the position determined by the stops. With this construction, the proper plowing position for the frame with respect to the furrow wheels is determined by the stops and the plowing depth is determined by the amount of retraction of the cylinder for the land wheel. The hydraulic cylinder for the land wheel is also provided with an adjustable stop which prevents retraction of the hydraulic cylinder beyond a preselected position so that the plow will assume the same plowing depth each time it is lowered.

9 Claims, 4 Drawing Figures

Patented May 8, 1973

INVENTORS
J. F. SULLIVAN
L. G. ARNOLD

INVENTORS
J. F. SULLIVAN
L. G. ARNOLD

TOWED PLOW

BACKGROUND OF THE INVENTION

The present invention relates generally to plows and more particularly relates to a hydraulic lift and depth control system for a drawn gang plow.

The typical drawn or towed plow is supported on front and rear furrow wheels and a land wheel, and is raised and lowered on the wheels by hydraulic cylinders. Since the plowing depth is controlled by the land wheel, that is, by the vertical position of the plow frame with respect to the land wheel, the cylinder or cylinders for the furrow wheels have been controlled by a hydraulic circuit separate from the hydraulic circuit used for controlling the cylinder for the land wheel. Through the use of the separate circuits, it was possible to vary the plow depth by raising and lowering the frame on the land wheel without affecting the position of the frame with respect to the furrow wheels. However, in order to have the two separate circuits, it was necessary to use the plow with a tractor having at least two remote hydraulic functions, and when used with the tractor having only two remote hydraulic functions, it was not possible to use other hydraulic functions such as hydraulic landing.

SUMMARY OF THE INVENTION

The principal object of the present invention is to provide a hydraulic lift and depth control system for a drawn plow in which all the cylinders can be controlled by a single remote hydraulic function on the propelling tractor.

A more specific object of the present invention is to provide a hydraulic depth control system for a drawn plow in which the position of the plow frame with respect to the wheels is controlled by a plurality of hydraulic cylinders connected in series.

Another object of the present invention is to provide, in a plow having a frame adjustably supported on front and rear furrow wheels and a land wheel, a hydraulic depth control system which utilizes a separate extensible and retractable hydraulic cylinder for controlling the position of the frame on each wheel, in which mounting structures for the front and rear furrow wheels are provided with stop means which determine the proper plowing position of the frame with respect to the furrow wheels, in which the hydraulic cylinders for the furrow wheels have lost-motion connections with the frame which permit limited additional retraction of the cylinders after the frame has been lowered to the position determined by the stop means for the furrow wheels, and in which all the hydraulic cylinders are connected in a single series so that through the use of a single remote function on the propelling tractor, the plow can be raised and lowered and the plowing depth can be determined by the amount of retraction of the hydraulic cylinder for the land wheel.

A further object of the present invention is to provide, in a plow as set forth above, an adjustable stop means to limit the retraction of the hydraulic cylinder for the land wheel so that once the stop is set, the plow can be lowered to the same plowing depth each time the cylinders are retracted.

The above objects and additional objects and advantages of the invention will become apparent to those skilled in the art from a reading of the following detailed description when taken in conjunction with the accompanying drawings.

DESCRIPTION OF THE PREFERRED EMBODIMENT

Figure 1:
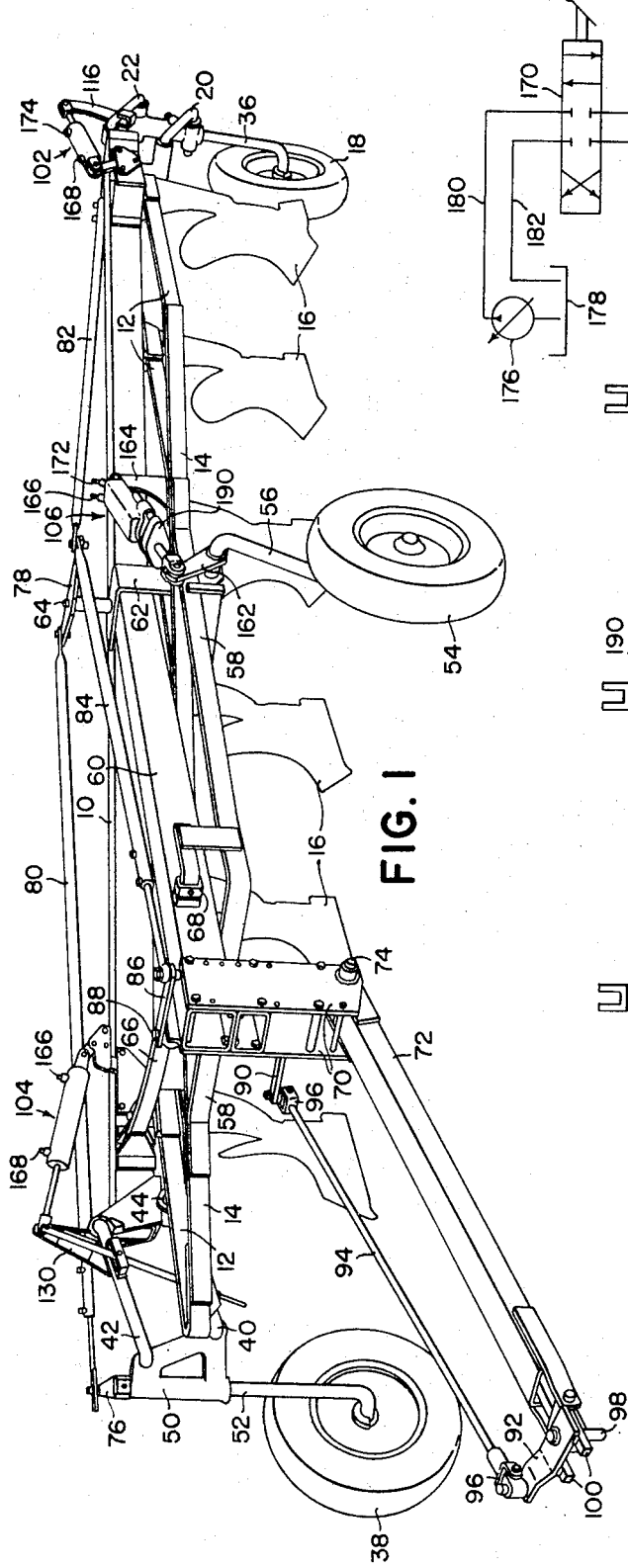
FIG. 1 is a perspective view of a plow constructed in accordance with the present invention.
Figure 4:
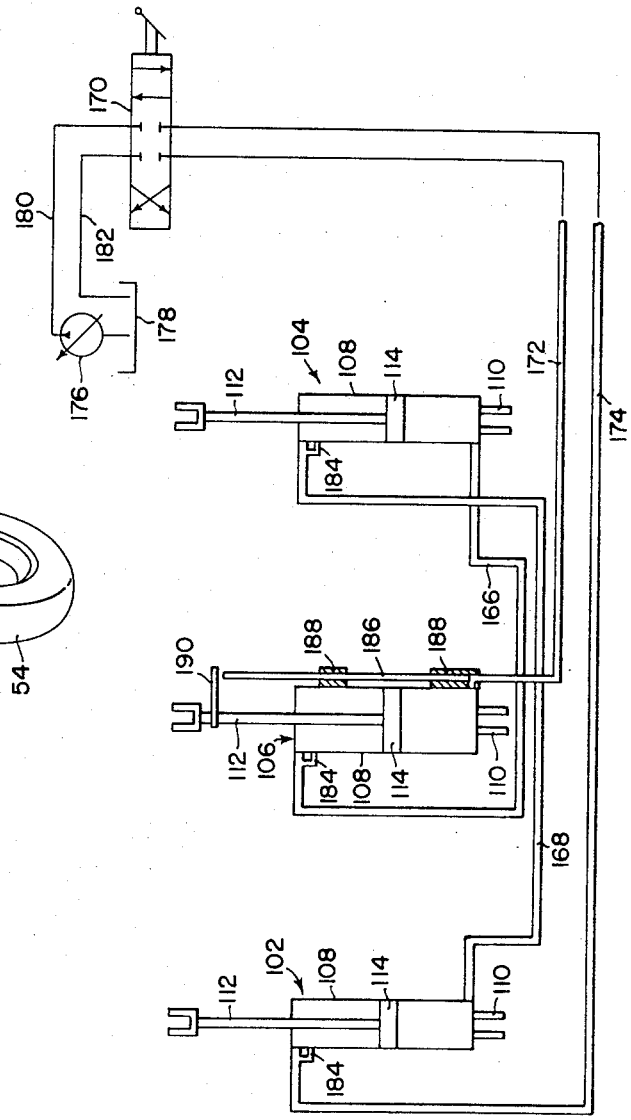

Referring now to the drawings, the plow according to the present invention includes a main frame consisting of a truss box 10 extending obliquely to the direction of movement of the plow and a plurality of forwardly extending frame bars 12 which have their rear ends rigidly secured to the truss box 10 and their forward ends rigidly secured to a truss bar 14 which extends parallel to the truss box 10. The frame bars 12 serve to reinforce the main frame and also serve as a convenient place to mount colters (undisclosed). A plurality of plow bottoms 16 are rigidly secured to and depend from the truss box 10.

The rear end of the main frame is adjustably supported on a rear furrow wheel 18 by upper and lower parallel links 20 and 22. The parallel links 20 and 22 have inturned end portions with the forward end portions pivotally mounted in bearings 24 and 26 forming part of a bracket 28 secured to the rear end of the truss box 10. The rear end portions of the links 20 and 22 are pivotally mounted in bearings 30 and 32 forming part of a cast sleeve member 34. The wheel 18 is mounted on the lower end of a vertical pivot shaft 36 which extends through and is journaled in the cast sleeve member 34.

The forward end of the main frame is supported on a front furrow wheel 38 by a pair of parallel links 40 and 42 which have inturned end portions. The rear end portions of the links 40 and 42 are pivotally mounted in bearings 44 and 46 forming part of a casting 48 which is secured to the forward end of a truss box 10. The forward end portions of the links 40 and 42 are pivotally mounted in bearings forming part of a cast sleeve member 50. The front furrow wheel 38 is mounted on the lower end of a vertical pivot shaft 52 which extends through and is journaled in the cast sleeve member 50.

The plow frame is supported at a third point by a land wheel 54 which is carried at the lower end of an axle arm 56 which has its upper end pivotally mounted in bearings secured to the truss bar 14 and a support bar 58 for the hitch frame to be described hereinafter. The support bar 58 is generally in the shape of a right angle and has its opposite ends secured to the truss bar 14.

An elongated draft frame 60 has its rear end pivotally connected between the legs of a bracket 62 by a pivot post 64. The bracket 62 is rigidly secured as by welding or the like to the truss box 10 intermediate the ends thereof so that the rear portion of the draft frame 60 is in effect pivotally connected to an intermediate portion of the truss box 10. Near its forward end, the draft tube 60 is supported by an arcuate frame bar 66 which has one end secured to the truss box 10 and its other end carried by the support bar 58. The draft frame 60 can, for the purpose of landing, be moved along the support bar 66 by pivoting about the post 64. Once the plow is properly landed, the draft frame 60 can be locked in position by clamps 68 which are secured to the support bar 66 on opposite sides of the draft frame 60. In lieu of the clamps 68, the plow could be hydraulically landed in the manner disclosed in copending U.S. application, Ser. No. 872,921.

A pair of hitch plates 70 are secured to and depend from the forward end of the draft frame 60, and the rear end of a hitch pole 72 is pivotally connected to the lower ends of the hitch plates by a pivot pin 74. The forward end of the hitch pole 72 is adapted to be attached to the drawbar of a tractor in a conventional manner.

Steering of the plow is accomplished by steering linkage which interconnects the front and rear furrow wheels with the tractor drawbar and turns the front furrow wheel 38 in the same direction as the tractor is turned and the rear furrow wheel 18 in an opposite direction. The steering linkage includes a steering arm 76 secured to the upper end of the pivot shaft 52 for the front furrow wheel and a similar steering arm (not illustrated) secured to the pivot shaft 36 for the rear furrow wheel. The steering arms for the front and rear furrow wheels are interconnected with the opposite ends of a lever arm 78 by rigid steering links 80 and 82. The lever arm 78 is mounted intermediate its ends on the upper end of the pivot post 64. An additional rigid steering link 84 interconnects the lever arm 78 with an additional steering arm 86 carried at the upper end of a vertical jackshaft 88 rotatably mounted on one of the hitch plates 70. The lower end of the jackshaft 88 also carries a steering arm 90 which is interconnected with a main steering arm 92 at the forward end of the hitch pole 72 by an additional steering link 94. The steering link 94 is interconnected with the steering arms 90 and 92 by universal joints 96 which compensate for any vertical movement of the lever arm 92 with respect to the lever arm 90. The main steering arm 92 has an integral hitch pin 98 which serves to connect the hitch tube 72 to the tractor drawbar and is also provided with a pair of guide bars 100 which straddle the drawbar and retain the steering arm 92 in a fixed position with respect to the drawbar when the hitch pin 98 is inserted through the drawbar and forward end of the hitch tube.

The plow frame is raised and lowered on the wheels 18, 38 and 54 by double-acting extensible and retractable hydraulic actuators 102, 104 and 106 respectively. Each of the hydraulic actuators includes a cylinder 108 having a closed anchor end 110 and a rod end through which the rod 112 of a piston and rod assembly 114 extends. The rod 112 of the hydraulic actuator 102 is pivotally connected to an upstanding arm 116 secured to the upper link 22 which supports the frame on the rear furrow wheel 18. The anchor end 110 of the actuator 102 has a lost-motion connection with the frame and to this end is pivotally connected to the upper end of an arm 118 which is pivotally connected, by a bolt 120, to a bracket 122 secured to the rear portion of the truss box 10. The pivotal movement of the arm 118 is limited by a pair of stops 124 secured to the bracket 122 by bolts 126. The bolts 120 and 126 also serve to mount a plate 128 which, in conjunction with the bracket 122, provide lateral support for the arm 118. When the actuator 102 is extended, the arm 118 is moved against the forward stop 124 and continued extension of the actuator 102 causes the rear portion of the frame to be raised on the wheel 18. Retraction of the actuator 102 permits the frame to lower on the rear furrow wheel 18 until an adjustable stop member 132 carried by the lower link 20 contacts the lower end of the arm 116 and prevents additional movement. Once the additional lowering movement of the frame on the rear furrow wheel 18 is prevented by the stop member 132, the arm 116 will move rearwardly to the extent permitted by the rear stop member 124 so that the actuator 102 can have limited additional retraction for a purpose to be explained hereinafter.

Figure 2:
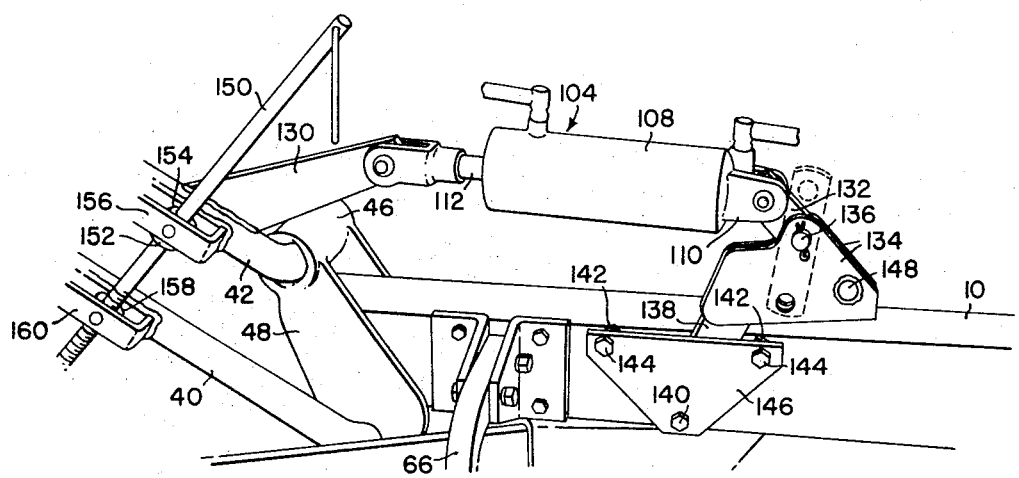
FIG. 2 is an enlarged view of the mounting and control structure for the front furrow wheel.
Figure 3:
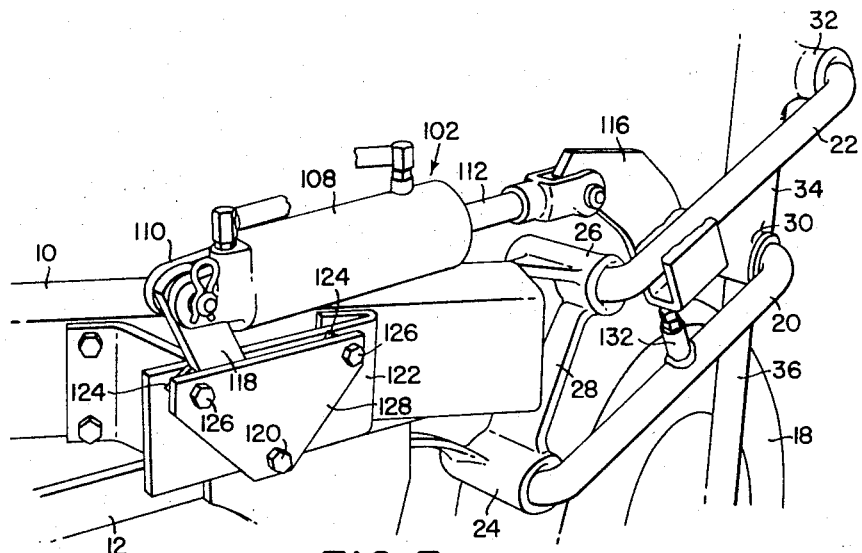
FIG. 3 is an enlarged perspective view of the mounting structure for the rear furrow wheel; and, FIG. 4 is a schematic view of the hydraulic system used to raise and control the working depth of the plow illustrated in FIG. 1.

The hydraulic actuator 104 has its rod 112 connected to a rock arm 130 which is secured to the upper link 42, and the anchor end 110 of the actuator 104 has a lost-motion connection with the forward end of the truss box 10. The anchor end of the actuator 104 is pivotally connected to the upper end of a first pivot arm 132 which is pivotally mounted intermediate its ends between a pair of plates 134 by a pivot pin 136, the plates 134 in turn being secured to the upper end of a second pivot arm 138 which has its lower end pivotally connected to the truss box 10 by a bolt 140. The movement of the second pivot arm 138 is limited by stops 142 which are secured to the truss box 10 by bolts 144. The bolts 140 and 144 also serve to mount a plate 146 which, in conjunction with the truss box 10, provides lateral support for the pivot arm 138. The lower end of a first pivot arm 132 is secured to the plates 134 in either of two positions by a pin 148. The lower end of the pivot arm 132 is normally secured in a rear position as illustrated in FIG. 2 so that the upper end of the pivot arm 132 is in a forward position. This properly positions the actuator 104 for control of the raising and lowering movement of the plow frame on the front furrow wheel during normal plowing positions. However, when opening land or making the first pass through a field, the front furrow wheel must run on unplowed land and therefore the frame must be lowered on the front furrow wheel a correspondingly greater distance. In order to permit the frame to move downwardly on the front furrow wheel and required distance, it is necessary to move the actuator 104 rearwardly with respect to the frame. This is accomplished by securing the lower end of the first pivot arm 132 in its forward position. By moving the lever arm 132 between its alternate positions, the working range of the actuator 104 with respect to the frame 10 is varied so that the frame can be lowered on the front furrow 38 beyond a normal plowing position to a land opening position.

Adjustable stop means are provided to limit the lowering movement of the frame on the front furrow wheel and the stop means includes an adjusting rod 150 which is provided with a fixed stop 152 adapted to abut the lower side of a stop block 154 carried by a bracket 156 secured to the upper link 42. The lower end of the rod 150 is threaded and passes through a correspondingly threaded adjusting nut 158 carried by a bracket 160 secured to the lower link 40. When the actuator 104 is retracted, the fixed stop 152 will contact the lower side of the stop block 154 to prevent additional lowering movement of the frame on the front furrow wheel, but forward movement of the second pivot arm 138 will permit limited additional retraction of the actuator 104.

The rod 112 of the actuator 106 is pivotally connected to the free end of a rock arm 162 secured to the axle arm 56 for the land wheel 54, and the anchor end 110 of the actuator 106 is pivotally connected to a bracket 164 rigid with the plow frame so that upon extension and retraction of the actuator 106, the frame will be raised and lowered respectively on the land wheel.

In order that the hydraulic actuators 102, 104 and 106 can all be controlled by a single remote hydraulic function on the tractor which will propel the plow, the actuators are all connected in series. To this end, the rod end of the cylinder of the actuator 106 is interconnected with the anchor end of the cylinder of the actuator 104 by a fluid line 166. Similarly, the rod end of the cylinder of the actuator 104 is interconnected with the anchor end of the cylinder of the actuator 102 by a fluid line 168. The anchor end of the cylinder of the actuator 106 and the rod end of the cylinder of the actuator 102 are connected to one side of a two-way control valve 170 by fluid lines 172 and 174 respectively. The valve 170 is part of the tractor which will tow the plow and constitutes one of the remote hydraulic functions of the tractor. The second side of the valve 170 is connected to a source of fluid pressure or pump 176 and a fluid reservoir 178 by fluid lines 180 and 182. With the hydraulic actuators connected in the manner described, movement of the valve 170 to the right of a neutral position simultaneously extends all the actuators and movement of the valve 170 to the left of the neutral position simultaneously retracts all the actuators.

In order that the actuators are extended and retracted through equal distances, the cylinders 108 are selected to be of matched displacement. That is, the rod end of the cylinder of actuator 106 has an effective cross-sectional area equal to the respective cross-sectional area of the anchor end of the cylinder of actuator 104, and the rod end of a cylinder of actuator 104 has an effective cross-sectional area equal to the effective cross-sectional area of the anchor end of the cylinder of actuator 102. Also, in order to provide a simple way of charging the actuators with fluid and to compensate for any leakage of fluid pass one of the pistons 114, each of the cylinders 108 is provided with a bypass circuit 184 at its rod end which will provide free flow of fluid through the cylinder each time its rod is fully extended. Thus, if one of the actuators should become fully extended before the other actuators, fluid will freely flow through the cylinder of that actuator so that the other actuators can be fully extended to thereby synchronize all of the actuators each time they are fully extended.

In the normal operation of the plow, the pivot arm 132 for the actuator 104 is secured in the position illustrated in solid lines in FIG. 2. The stop 152 for the front furrow wheel is then adjusted to contact the stop block 154 when the front plow bottom is operating at exactly the same depth as the front furrow wheel. The stop mechanism 132 for the rear furrow wheel is also adjusted so that it will contact the lower end of the arm 116 when the rear plow bottom and the rear furrow wheel are operating at exactly the same depth. Then, by moving the valve 170 to the left, the actuators 102, 104 and 106 are retracted to lower the plow frame on the wheels. After the plow frame has been lowered on the front and rear furrow wheels to the extent permitted by the stops, the pivot arm 138 for the actuator 104 will move forwardly and the pivot arm 118 for the actuator 102 will move rearwardly to permit additional retraction of the actuators 102 and 104 so that the actuator 106 for the land wheel 54 can have additional retraction. The amount of retraction of the actuator 106 and thus the lowering movement of the frame on the land wheel 54 determines the plowing depth. When it is decided to raise the plow, it is only necessary to move the valve 170 to the right to extend the actuators and raise the plow frame on the wheels.

The actuator 106 for the land wheel is also provided with an adjustable stop mechanism which prevents retraction of the rod 112 after it has been retracted to a position determined by the setting of the stop mechanism so that the plow frame will assume the same plowing depth on the land wheel each time the plow is lowered. This stop mechanism includes a rod member 186 slidably carried by blocks 188 secured to the cylinder 108 and an abutment member 190 adjustably secured in any desired position on the rod 112. As the rod 112 is retracted so that the abutment 190 contacts the stop rod 186, additional retraction will cause the opposite end of the stop rod to move into and obstruct the passage from the anchor end of the cylinder to prevent further exhaust of fluid from the anchor end of the cylinder into the fluid line 172. With the exhaust of fluid from the anchor end of the cylinder of the actuator 106 blocked, the exhaust of fluid from the anchor ends of all the other cylinders is also blocked and additional retraction of all the actuators is prevented. When the valve 170 is again moved to the right to interconnect the pump 176 with the fluid line 172, fluid pressure in line 172 will move the rod 186 from the passage to the anchor end of the cylinder of actuator 106 so that fluid is free to flow into the anchor end of the cylinder. By adjusting the position of the abutment member 190 on the rod 112 to a position corresponding with the desired plowing depth, the plow is automatically lowered to the proper plowing depth each time the valve 170 is moved to the left without any action on the part of the operator other than moving the valve 170 to the left.

The only variation in the operation described above is when land is first opened. To open land, it is necessary to move the pivot arm 132 for the actuator 104 to the position illustrated in dotted lines in FIG. 2 and to adjust the stop 152 downwardly so that the plow frame can be lowered on the front furrow wheel 38 beyond the normal plowing position to an opening-up position.

Having thus described a preferred embodiment of the invention, various modifications within the spirit and scope of the invention will become apparent to those skilled in the art and can be made without departing from the underlying principles of the invention.

We claim:

1. A plow comprising: a frame extending obliquely to the direction of movement of the plow; a plurality of plow bottoms secured to and depending from the frame; front and rear furrow wheel means adjustably secured to and supporting the frame; land wheel means adjustably secured to and supporting the frame; a plurality of extensible and retractable hydraulic cylinder means having opposite ends connected between the frame and the respective wheel means to raise and lower the frame on the wheel means upon extension and retraction respectively; first fluid line means connected to one end of the hydraulic cylinder means connected between the frame and the land wheel means for optionally conveying fluid to and from the hydraulic cylinder connected between the frame and land wheel means; additional fluid line means connecting all the hydraulic cylinder means in series with the hydraulic cylinder connected between the frame and land wheel means being first in the series when raising the frame; each of front and rear furrow wheel means including stop means to limit lowering movement of the frame on the front and rear furrow land wheel means; and the hydraulic cylinder means connected between the frame and the front furrow wheel and the hydraulic cylinder means connected between the frame and rear furrow wheel each having a lost-motion connection at one end which affords additional retraction of the hydraulic cylinder means after the frame has been lowered to the position determined by the stop means on the front and rear furrow wheel means.

2. The plow set forth in claim 1 wherein and the hydraulic cylinder means connected between the frame and the land wheel means includes adjustable means to prevent additional retraction of the hydraulic cylinder means connected between the frame and the land wheel means when the last-mentioned hydraulic cylinder means has been retracted to a preselected position.

3. The plow set forth in claim 2 wherein the means to prevent additional retraction of the hydraulic cylinder means connected between the frame and land wheel means includes means to prevent the exhaust of fluid from the last-mentioned hydraulic cylinder means through the first fluid line means when the last-mentioned hydraulic cylinder means has been retracted to the preselected position.

4. The plow set forth in claim 3 wherein the stop means on the front furrow wheel means is adjustable, and the lost-motion connection at one end of the hydraulic cylinder means for the front furrow wheel means is adjustable to vary the working range of the last-mentioned hydraulic cylinder means with respect to the frame whereby the frame can be lowered on the front furrow wheel means beyond the normal working position to a land-opening position.

5. The plow set forth in claim 4 wherein the lost-motion connection for the hydraulic cylinder means for the front and rear furrow wheel means each include lever means pivotally mounted on the frame, the hydraulic cylinder means for the front and rear furrow wheel means are each connected to the lever means, and stop means carried by the frame limit movement of the lever means.

6. A plow comprising: a frame; a plurality of plow bottoms secured to and depending from the frame; front and rear furrow wheel means adjustably secured to and supporting the frame; land wheel means adjustably secured to and supporting the frame; a plurality of extensible and retractable hydraulic cylinder means connected between the frame and the respective wheel means to raise and lower the frame upon extension and retraction respectively; each of the hydraulic cylinder means including a cylinder having anchor and rod ends and a piston and rod assembly reciprocally mounted in the cylinder with the rod projecting from the rod end of the cylinder; the anchor end of each cylinder being connected to the frame and each rod being connected to the respective wheel means; fluid line means having one end connected to the anchor end of the cylinder for the land wheel means for optionally conveying fluid to and from the last-mentioned cylinder; and additional fluid line means interconnecting the rod end of the cylinder for the land wheel with the anchor end of a second of the cylinders and the rod end of the second of the cylinders with the anchor end of a third of the cylinders; each of the front and rear furrow wheel means including stop means limiting downward movement of the frame on the front and rear furrow wheel means; and the anchor ends of the cylinders for the front and rear furrow wheel means having a lost-motion connection with the frame which affords limited additional retraction of the hydraulic cylinder means for the front and rear furrow wheel means after the frame has been lowered on the front and rear furrow wheel means to the position determined by the stop means, whereby, upon retraction of the hydraulic cylinder means, the frame is lowered on the front and rear furrow wheels to the proper plowing position and the amount of retraction of the hydraulic cylinder means for the land wheel determines the plowing depth.

7. The plow set forth in claim 6 wherein the lost-motion connections between the frame and the anchor ends of the cylinders for the front and rear furrow means includes lever means pivotally connected to the frame, the anchor ends of the cylinders are connected to the free ends of the lever means, and stop means on the frame limit movement of the lever means.

8. The plow set forth in claim 7 wherein the hydraulic cylinder means for the land wheel means is provided with adjustable stop means to limit its retraction whereby the plowing depth is determined by the setting of the adjustable stop means.

9. The plow set forth in claim 7 wherein the stop means on the front furrow wheel means is adjustable to vary the lower limit of the frame on the front furrow wheel means, and the lever means interconnecting the frame and the anchor end of the cylinder for the front furrow wheel means includes first and second sections pivotally interconnected and means for selectively locking said sections in different relative positions to vary the working range of the hydraulic cylinder means for the front furrow wheel means with respect to the frame.

* * * * *